C. A. CAMPBELL & H. O. OLSEN.
CLOSET BOWL.
APPLICATION FILED MAY 27, 1915.

1,182,750.

Patented May 9, 1916.

Witnesses
Fenton S. Belt
J. W. Sherwood

Inventors
Charles A. Campbell
and Harold O. Olsen
By Franklin H. Hough
Attorney

UNITED STATES PATENT OFFICE.

CHARLES A. CAMPBELL AND HAROLD O. OLSEN, OF WATERTOWN, NEW YORK.

CLOSET-BOWL.

1,182,750.   Specification of Letters Patent.   Patented May 9, 1916.

Application filed May 27, 1915. Serial No. 30,837.

*To all whom it may concern:*

Be it known that we, CHARLES A. CAMPBELL and HAROLD O. OLSEN, citizens of the United States, residing at Watertown, in the county of Jefferson and State of New York, have invented certain new and useful Improvements in Closet-Bowls; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in closet bowls and especially in the provision of means for heating the same by electrical resistance wires and comprises a simple and efficient device of this nature, having various details of construction, combination and arrangements of parts which will be hereinafter fully described, shown in the accompanying drawings and then specifically defined in the appended claim.

Figure 1:
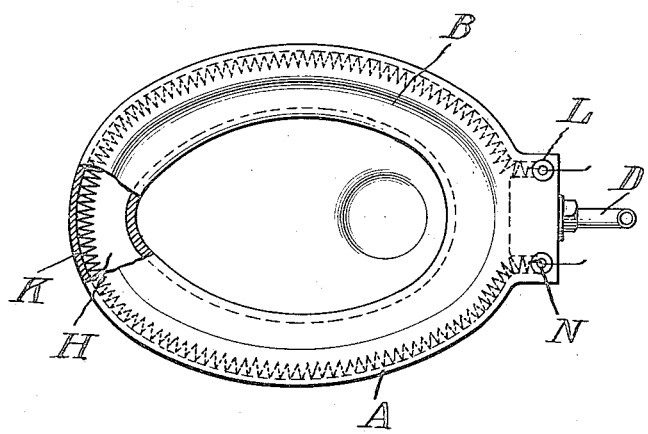
Figure 2:
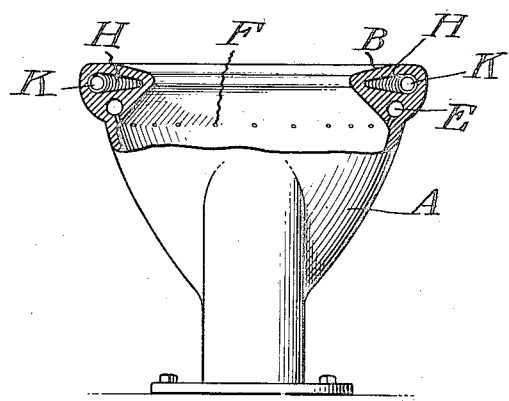

The invention is illustrated in the accompanying drawings, in which:

Figure 1 is a top plan view of the bowl, a part being shown in section to better illustrate the invention. Fig. 2 is a cross sectional view vertically through the bowl.

Reference now being had to the details of the drawings by letter, A designates a bowl which may be of any suitable material and construction, preferably with a top B shaped to form a seat, and D designates a pipe through which water is allowed to enter the annular compartment E, the wall of which is provided with perforations F leading into the interior of the bowl. Immediately above the water chamber is a widened chamber H and extending entirely around the top or flanged part of the bowl. A coiled wire K passes through the chamber H and is connected to the terminals L and N and to which electrical connection may be had. It will be noted that said wire, which forms a resistance wire for electrical current, engages the outer concaved wall of the chamber H, a space intervening between the wire and the inner tapering end of the recess or chamber, allowing a space for the accumulation of heat adapted by radiation to heat the portion of the bowl above the chamber. The chamber H is widened horizontally and is located above the water compartment and is tapered from the outer to the inner wall thereof, and the wire K is frictionally held in the outer part thereof and prevented from displacement by the wedge-shaped walls of said chamber. Furthermore, this widened chamber provides for more uniform heating of the top of the bowl, and no insulation or other substance is required within said chamber.

What is claimed to be new is:—

As an improved article of manufacture, a bowl having its top shaped to form a seat integral with the bowl and an annular water compartment and an annular chamber above and independent of said water compartment and horizontally widened and tapered from the outer to the inner end thereof, and a resistance wire positioned in said chamber and held therein by frictional engagement with the wall thereof.

In testimony whereof we hereunto affix our signatures in presence of two witnesses.

CHARLES A. CAMPBELL.
HAROLD O. OLSEN.

Witnesses:
ARTHUR HENDRICKS,
HENRY H. DEANE, Jr.